(12) United States Patent
Holland et al.

(10) Patent No.: US 6,312,352 B1
(45) Date of Patent: Nov. 6, 2001

(54) SYNCHRONOUS BELT DRIVE TENSIONING ASSEMBLY

(75) Inventors: Ronald Paul Holland, Fox Lake; Christopher Scott Thorman, Beaver Dam, both of WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/393,804

(22) Filed: Sep. 10, 1999

(51) Int. Cl.⁷ ..................................................... F16H 7/10
(52) U.S. Cl. ........................ 474/113; 474/118; 474/133; 56/11.6
(58) Field of Search ..................................... 474/117, 118, 474/133, 134, 138, 101, 115, 112, 901; 248/125.2; 56/11.6, 320.1

(56) References Cited

U.S. PATENT DOCUMENTS

| | | | |
|---|---|---|---|
| Re. 27,861 | * 1/1974 | Kraus | 474/134 |
| 1,578,700 | 3/1926 | Anderson . | |
| 1,809,344 | * 6/1931 | Linn | 474/138 |
| 2,010,056 | 8/1935 | Brush | 74/242.1 |
| 2,945,393 | 7/1960 | Paulson | 74/472 |
| 3,142,193 | 7/1964 | Polko et al. | 74/242.11 |
| 3,817,114 | 6/1974 | Klee | 74/242.1 |
| 4,016,709 | 4/1977 | Hauser et al. | 56/10.2 |
| 4,416,647 | 11/1983 | White | 474/134 |
| 4,557,710 | * 12/1985 | Greider | 474/118 |
| 4,925,437 | * 5/1990 | Suzuki et al. | 474/135 |
| 5,098,347 | 3/1992 | Sajczvk et al. | 474/135 |
| 5,152,721 | 10/1992 | Sajczvk et al. | 474/135 |
| 5,361,566 | 11/1994 | Hohnl | 56/11.6 |
| 5,390,479 | 2/1995 | Hutchison et al. | 56/11.3 |
| 5,769,747 | 6/1998 | Kuhn et al. | 474/135 |
| 5,836,144 | 11/1998 | Hohnl et al. | 56/320.1 |
| 6,176,071 | * 1/2001 | Thorman et al. | 56/11.6 |

FOREIGN PATENT DOCUMENTS

| | | |
|---|---|---|
| 174480 | 9/1906 | (DE) . |
| 0 038 233 A1 | 10/1981 | (GB) . |
| 0 053 954 A1 | 6/1982 | (GB) . |
| 0 487 146 A2 | 5/1992 | (GB) . |

OTHER PUBLICATIONS

Sabre 1338GR/1538GR Lawn Tractors Owner's Manual, cover, foreword and pp. ENG22 to ENG25, published 1999 in U.S.A.

John Deere LTR155 and LTR166 Lawn Tractors Parts Catalog, cover and pp. E5 to E6, published 1999 in U.S.A.

John Deere LT133, LT155 & LT166 Technical Manual, cover and pp. 10–4, 10–12 to 10–15 and 10–17, published 1998 in U.S.A.

* cited by examiner

Primary Examiner—David A. Bucci
Assistant Examiner—Vicky A. Johnson

(57) ABSTRACT

A tensioning assembly is provided for a synchronous belt drive on a mower deck. A plurality of idlers are mounted for rotation on bracket. One end of the a bracket engages an abutment surface mounted on the deck which restricts its movement, whereas a second end of the bracket is acted upon by a tensioning member which acts in substantially the same direction as the abutment surface. The bracket includes an elongated slot disposed between one of the idlers and the abutment surface, and a member fixed to the deck is engageable with the slot for confining movement of the bracket.

17 Claims, 6 Drawing Sheets

SYNCHRONOUS BELT DRIVE TENSIONING ASSEMBLY

BACKGROUND OF THE INVENTION

1. Field of the Invention

The present invention relates to synchronous drives and more particularly to assemblies for tensioning a drive belt in a synchronous drive. A preferred embodiment of the present invention relates to a synchronous belt drive tensioning assembly for use on a rotary mower deck.

2. Description of Related Art

Vehicles such as lawn and garden tractors are often adapted to carry and operate implements such as mower decks which require rotary drive input. To drive the blade or blades of a mower deck, a pulley and belt primary drive arrangement is commonly provided in which a pulley is coupled with a crankshaft on the vehicle's engine. A V-belt is entrained around the crankshaft pulley as well as a pulley which is operably coupled to the spindles of the mower implement. Often, the V-belt entrained around the crankshaft pulley is part of a primary drive system which is coupled to a secondary drive system by a double-pulley jacksheave arrangement which may, for example, utilize a spindle on the mower implement as a jackshaft connecting the two pulleys of the jacksheave.

Synchronous, or timed, drives are known which allow a plurality of blades to overlap in cutting area without interfering with each other. Synchronous drives have been implemented on a multiple blade mower deck as a secondary drive system which operates in conjunction with the primary drive to maintain proper blade orientation to prevent interference. A typical synchronous secondary drive system includes a toothed belt or chain, a mating toothed sprocket on each of the mower spindles and at least one tensioning idler which is commonly spring-biased to provide tension on the belt.

Problems commonly associated with conventional synchronous drives include: slipping or other undesired movement of tensioning idler, bending of idler support brackets upon movement of the tensioning idler, inability to obtain a desired tension in the toothed belt directly and predictably, and the loss of proper orientation (timing) of the sprockets/spindles/blades due to movement (ratcheting) of the toothed belt relative to the mating toothed sprockets.

SUMMARY OF THE INVENTION

The present invention provides a tensioning assembly for a synchronous belt drive on a mower deck. A plurality of idlers are mounted for rotation on a bracket. One end of the bracket engages an abutment surface mounted on the deck which restricts its movement, whereas a second end of the bracket is acted upon by a tensioning member which acts in substantially the same direction as the abutment surface. The bracket includes an elongated slot disposed between one of the idlers and the abutment surface, and a member fixed to the deck and engageable with the slot for confining movement of the bracket.

The preferred embodiment of the present design provides a synchronous drive which provides rigid and symmetrical support to idler sprockets before and after the tensioning process, a predictable and simple method for tensioning the drive belt, and a high degree of belt wrap to reduce (left) spindle-belt ratcheting, adjustable belt guides to eliminate (right) spindle-belt ratcheting, individual support plates for the spindles and secondary drive components, and formed features extending radially outward from the spindle pocket allowing hardware mounting of the support plates.

DETAILED DESCRIPTION OF EXEMPLARY EMBODIMENT

Figure 1:
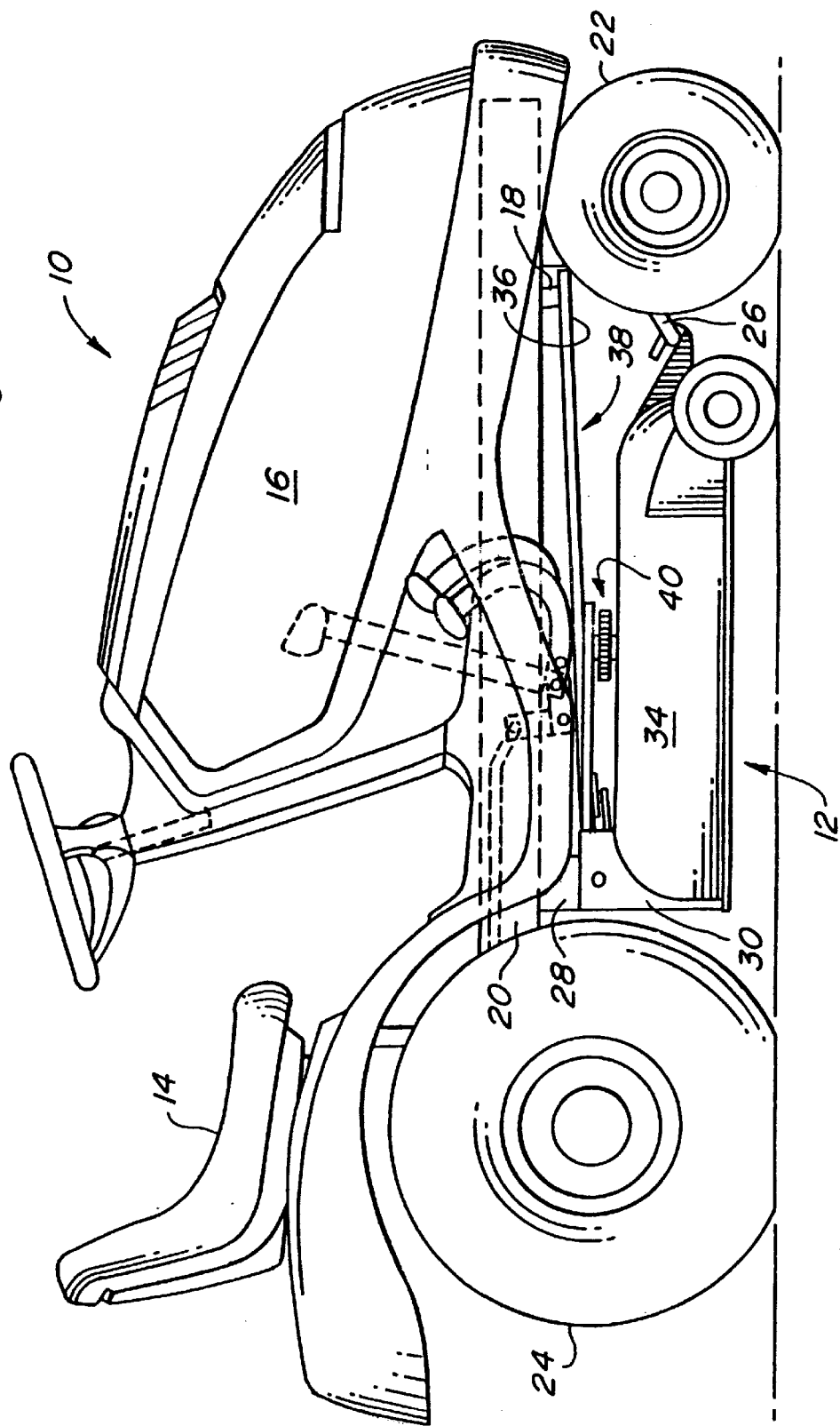
FIG. 1 illustrates a side view of a lawn and garden vehicle which carries a belly-mounted mower deck utilizing the drive structure of the present invention.

Looking now to FIG. 1, there is illustrated a lawn-and-garden-type vehicle 10 carrying a mower deck 12 therebeneath. The vehicle 10 includes a operator seat 14, a hood 16, and an engine (not shown) which has its crankshaft 18 extending through the chassis 20 of the vehicle 10 and projecting beneath it. The vehicle 10 further includes front steerable wheels 22 as well as rear drive wheels 24.

The mower deck 12 is vertically adjustable and is attached to the vehicle 10 by a front tow rod 26 which pulls it along. At its rear portion, the deck 12 is attached to the vehicle 10 by a linkage 28 extending from the chassis 20 and engaging the mower deck 12 at mounting bracket 30 on each side of the mower deck 12. The deck 12 includes blades 32 (shown in FIG. 2) which rotate within a housing 34 to cut vegetation as the vehicle 10 moves across the ground. The blades 32 are driven by the crankshaft 18 of the vehicle 10 through a drive pulley 36 mounted on the crankshaft 18 which is connected to the blades 32 through primary and secondary drive assemblies 38, 40. In the preferred embodiment, an electric clutch (not shown) is mounted on the crankshaft 18 to allow for convenient engagement and disengagement of the drive pulley 36 and thereby, transmission of power to the mower deck 12 through the primary drive 38.

Figure 2:
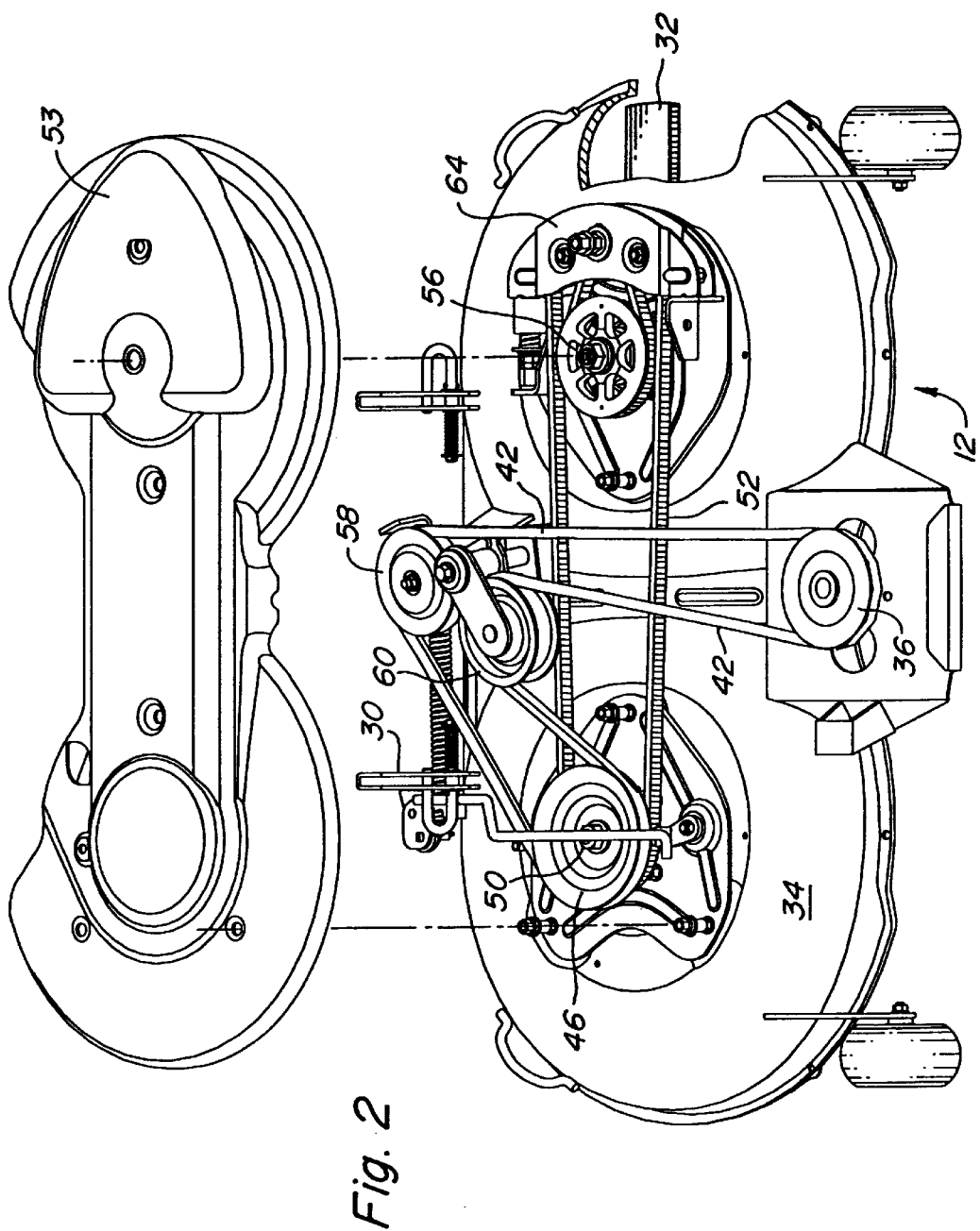
FIG. 2 illustrates a perspective view of enlarged and partial side view of the mower deck and drive structure including primary and secondary drive assemblies.

In FIG. 2 a perspective view of the mower deck 12 is shown more clearly illustrating the primary and secondary drive assemblies 38, 40 which transmit rotational power from the drive pulley 36 to the mower blades 32. A primary drive belt 42 is driven by the drive pulley 36 and engages a double pulley jacksheave comprising a driven primary sheave 46 and a mower deck pulley 48 (shown in FIG. 6) mounted spaced apart on a vertically aligned blade spindle 50 (on the right side of the deck 12 as viewed by an operator in the seat 14) which acts as a jackshaft between the sheave 46 and pulley 48. A secondary drive belt 52 is housed under a shield 53 and driven by the mower deck pulley 48 of the jacksheave and engages a further mower deck pulley 54 which is fixed to a further vertically aligned blade spindle 56. Mower blades 32 coupled to the lower portions of the blade spindles 50, 56 are operatively driven by the vehicle's primary and secondary drive assemblies 38, 40 for rotation within the housing 34 of the deck 12 to thereby cut vegetation and grass. As the drive pulley 36 is driven by the engine, the rotational output of the pulley 36 is transmitted to the mower blades 32 via the primary belt 42, jacksheave , secondary belt 52, mower deck pulleys 48, 54 and spindles 50, 56. A pair of primary drive idler pulleys 58, 60 are carried on the deck 12, and act to tension the primary drive belt 42, while a pair of secondary drive idler pulleys 62 are carried on a secondary idler bracket 64 and serve to tension the secondary drive belt 52.

In the embodiment shown, the blades 32 counterrotate and their cutting paths overlap so that it is necessary to control their relative position during their rotation. Therefore it is desirable to configure the secondary drive assembly 40 as a synchronous, or timed, drive. In the secondary drive assembly 40 shown the pulleys 48, 54, 62 are configured as toothed sprockets which engage mating teeth on the secondary drive belt 52, although a chain drive may alternately be used.

Figure 3:
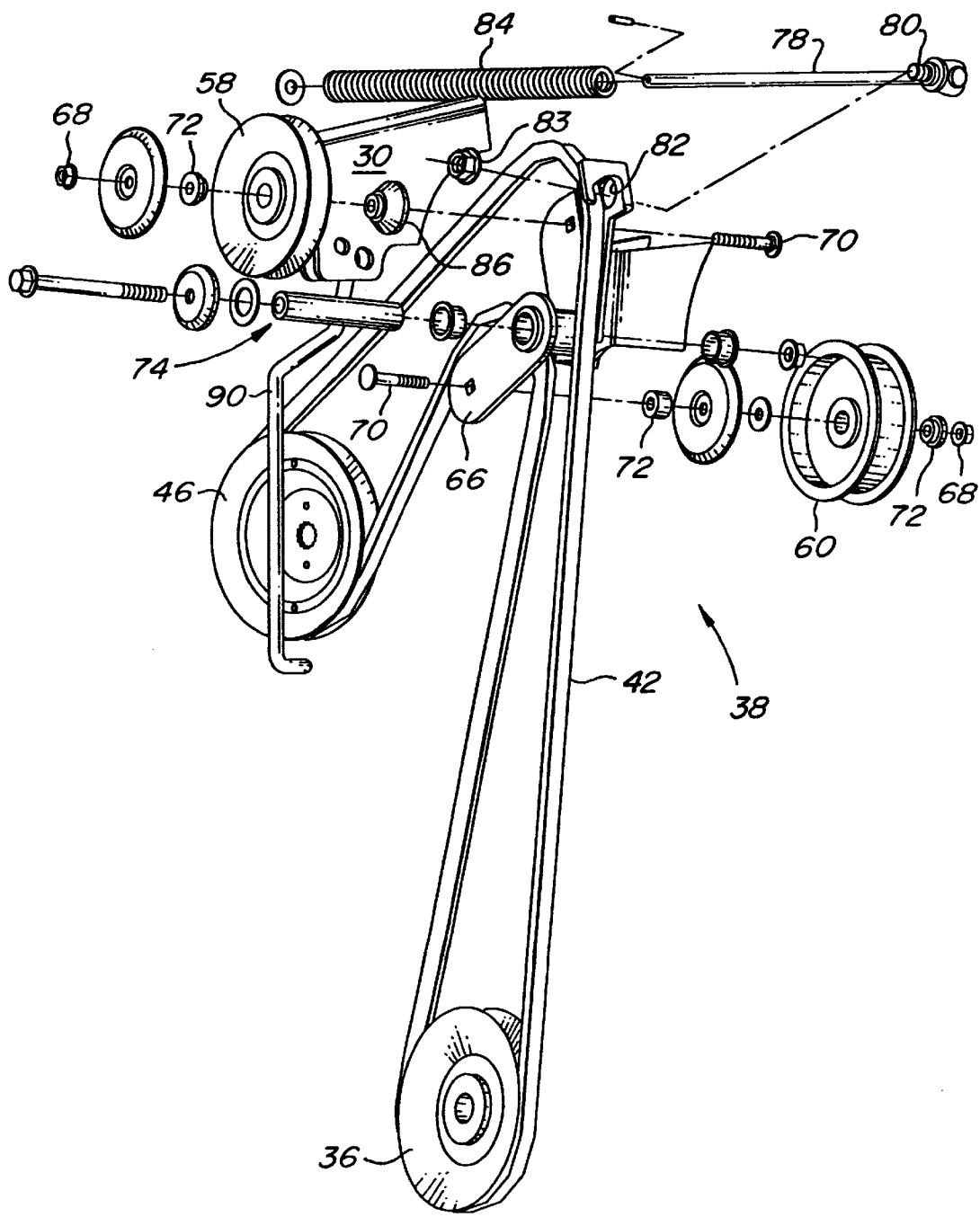
FIG. 3 illustrates an exploded view of the primary drive assembly.

Referring now to FIG. 3, the primary drive assembly 38 is shown in exploded fashion. The primary drive belt 42 receives rotary input from the drive pulley 36. During rotation of the belt 42, a fixed point on the belt 42 will pass from the drive pulley 36 around a tightside primary idler 58, next encountering the driven primary sheave 46 about which the belt 42 is entrained, transferring power thereto. From the driven primary sheave 46, the fixed point on the belt 42 will encounter a backside idler pulley 60, returning then to the drive pulley 36.

The tightside primary idler pulley 58 and backside primary idler pulley 60 are carried by a primary drive idler bracket 66 which maintains a fixed relationship therebetween. The pulleys 58, 60 are rotatably secured to the bracket 66 by nuts 68 and bolts 70 and a series of bushings 72 which allow the pulleys 58, 60 to rotate freely with respect to the bracket 66. A belt guide provision 73 of the bracket 66 assists in keeping the belt 42 properly entrained around the tightside idler pulley 58 during operation.

The primary drive idler bracket 66 in turn is carried on a pivot shaft 74 in the form of a bolt, sleeve and bushing arrangement inserted through a central aperture in the bracket 66, pivotally coupling the idler bracket 66 to the housing 34 (FIG. 2) at a mounting bracket 76. The pivot shaft 74 and pivot axis created thereby are preferably disposed at an angle from vertical to allow the idler bracket to pivot as the deck shifts vertically, and thereby serve to position the idler pulleys at an intermediate position between the elevations of the drive pulley 36 and the driven primary sheave 46. The primary drive belt 42 therefore assumes relatively small angles from horizontal with respect to the various pulleys about which it is entrained. Wear in the belt as it contacts the various sheaves is thereby reduced, and the belt 42 will tend not to come off the sheaves as frequently. The preferred embodiment therefore provides a primary drive assembly 38 which reduces or eliminates problems associated with sheave misalignment and excessive belt angles.

The primary drive idler pulleys 58, 60 serve to tension the primary drive belt 42 by effectively lengthening the path of the belt as the bracket 66 is rotated clockwise. Because both the tightside idler pulley 58 and the backside idler pulley 60 are coupled to the bracket 66, the amount of belt takeup achieved by rotating the bracket 66 is greatly increased (nearly doubled). A tensioning rod 78 is used to provide a force on the bracket 66 tending to rotate the bracket 66 clockwise, increasing tension on the belt 42. The tensioning rod 78 is secured to the bracket 66 by a threaded upturned endportion 80 which is received in a corresponding aperture 82 in the bracket 66 and secured by a nut 83. The rod 78 is inserted through a helical spring 84 and further through an orifice 86 in the mounting bracket 30. Once through the bracket 30, the rod 78 is passed through an endplate 88 of a tension relief handle 90 (as may be seen in FIGS. 4–5). The end of the rod 78 extending through the endplate 88 (opposite the endportion 80) is provided with a throughbore 92 into which a crosspin 94 is positioned to prevent the rod 78 from sliding back through the endplate 88 and the orifice 86. The mounting bracket 30 is provided with a handle mounting provision 96 formed as a flat horizontal extension around which the U-shaped endplate 88 of the handle 90 is positioned and attached thereto by a bolt 98 for pivotal movement thereabout. To install the tensioning rod 78 with the spring 84 crosspin 94 installed, the rod is rotated so that the crosspin 94 is parallel to the legs of the U-shaped endplate 88. The rod is inserted through the bracket 30 and the endplate 88 and rotated so that the crosspin 94 is perpendicular to the legs of the U-shaped endplate 88 and the endportion 80 of the rod 78 is turned upwardly and may be received in the aperture 82 and secured to the bracket 66. The crosspin 94 is long enough to abut the legs of the endplate 88 to prevent the rod 78 from passing through when the crosspin 94 is perpendicular to the legs of the U-shaped endplate 88.

Figure 4:
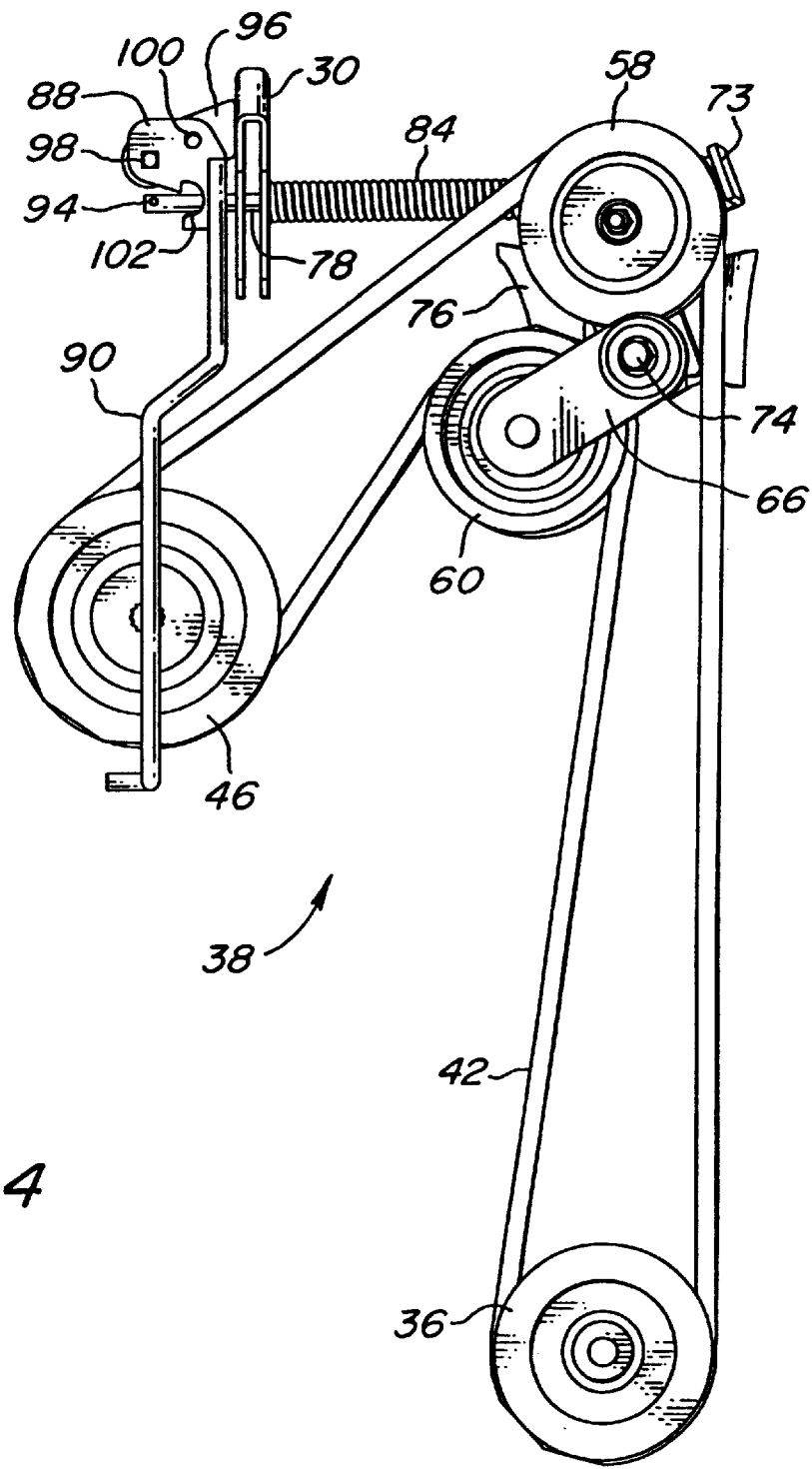
FIG. 4 illustrates a plan view of the primary drive assembly showing the tension relief handle in its normal position.

Referring now to FIG. 4, during operation, the spring 84 is compressed between the endportion 80 and the mounting bracket 30 that the endportion 80 tends to rotate the bracket 66 clockwise. The idler pulleys 58, 60 each serve to lengthen the path of the belt 42, taking up slack and creating tension in the belt 42. The handle 90 is shown in its normal operational position and may be secured in position by inserting a pin through aligned holes 100 in the handle endplate 88 and the mounting provision 96. In the normal operating position, the crosspin 94 extends beyond the endplate 88 and the rod 78 may slide back and forth axially as the load on the belt 42 causes the bracket 66 to act against the spring 84.

Figure 5:
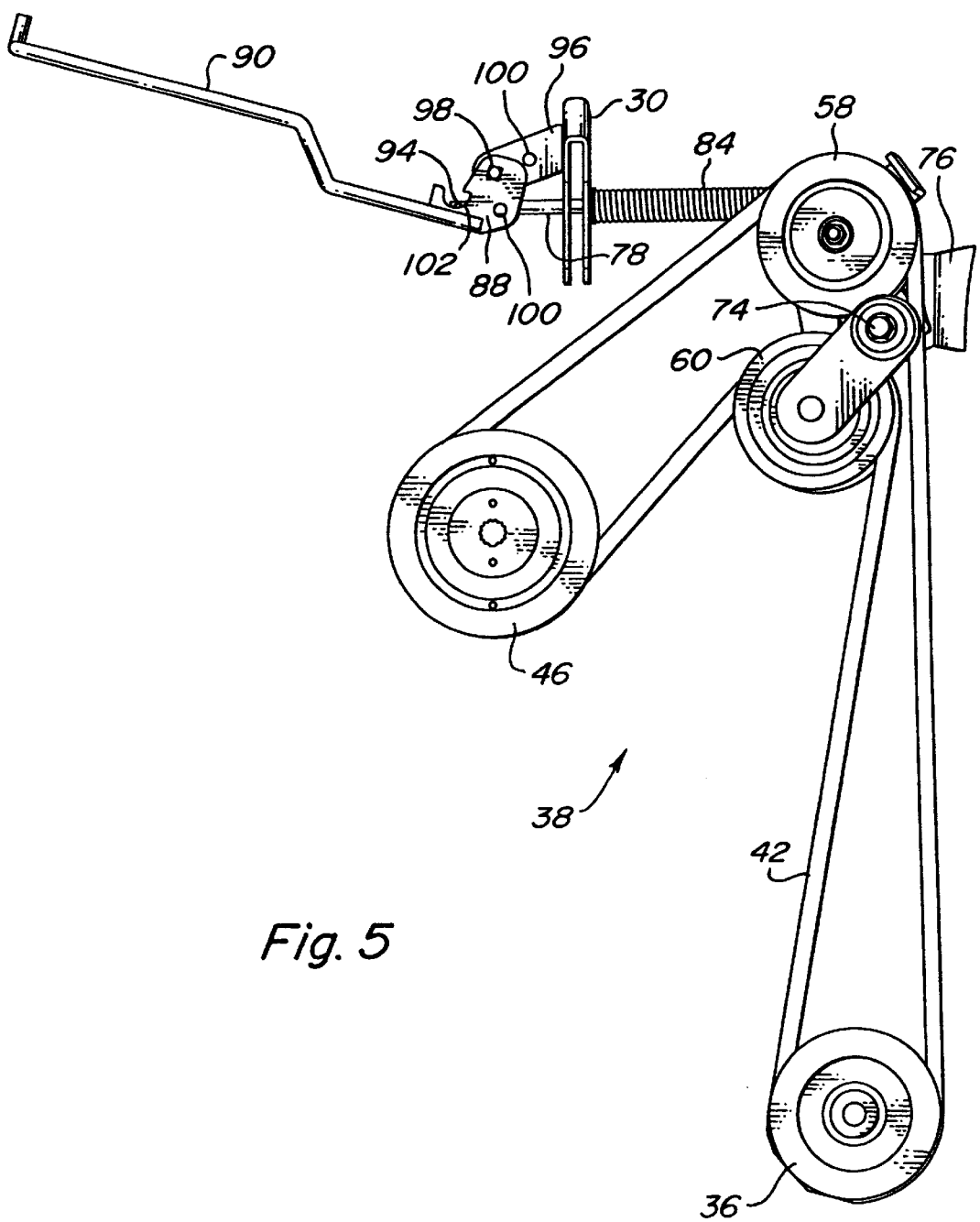
FIG. 5 illustrates the primary drive assembly of FIG. 4 wherein the handle is in its belt installation/removal position.

When it is desirable to install or remove the belt 42 from the primary drive assembly 38, it becomes necessary to relieve tension on the belt 42 so that it can be removed from the pulleys about which it is entrained. FIG. 5 illustrates the primary drive assembly 38 wherein the handle 90 has been moved to a belt installation/removal position to effect a reduction in belt tension. When the handle 90 is rotated clockwise from its normal position (shown in FIG. 4), the endplate 88 moves toward the crosspin 94 of the tensioning rod 78 until the crosspin 94 abuts the endplate 88 at a cammed inner surface 102 formed in the legs of the endplate 88. After the crosspin 94 abuts the cammed inner surface 102, further clockwise rotation of the handle will pull the tensioning rod 78, rotating the bracket 66 counterclockwise so that the idler pulleys 58, 60 carried thereon effectively shorten the path of the primary drive belt 42. The belt 42 may then be removed or installed. After the belt 42 has been installed, the handle 90 may be rotated counterclockwise to its normal position so that the force of the spring 84 will rotate the bracket 66 clockwise, again tensioning the belt 42.

Figure 6:
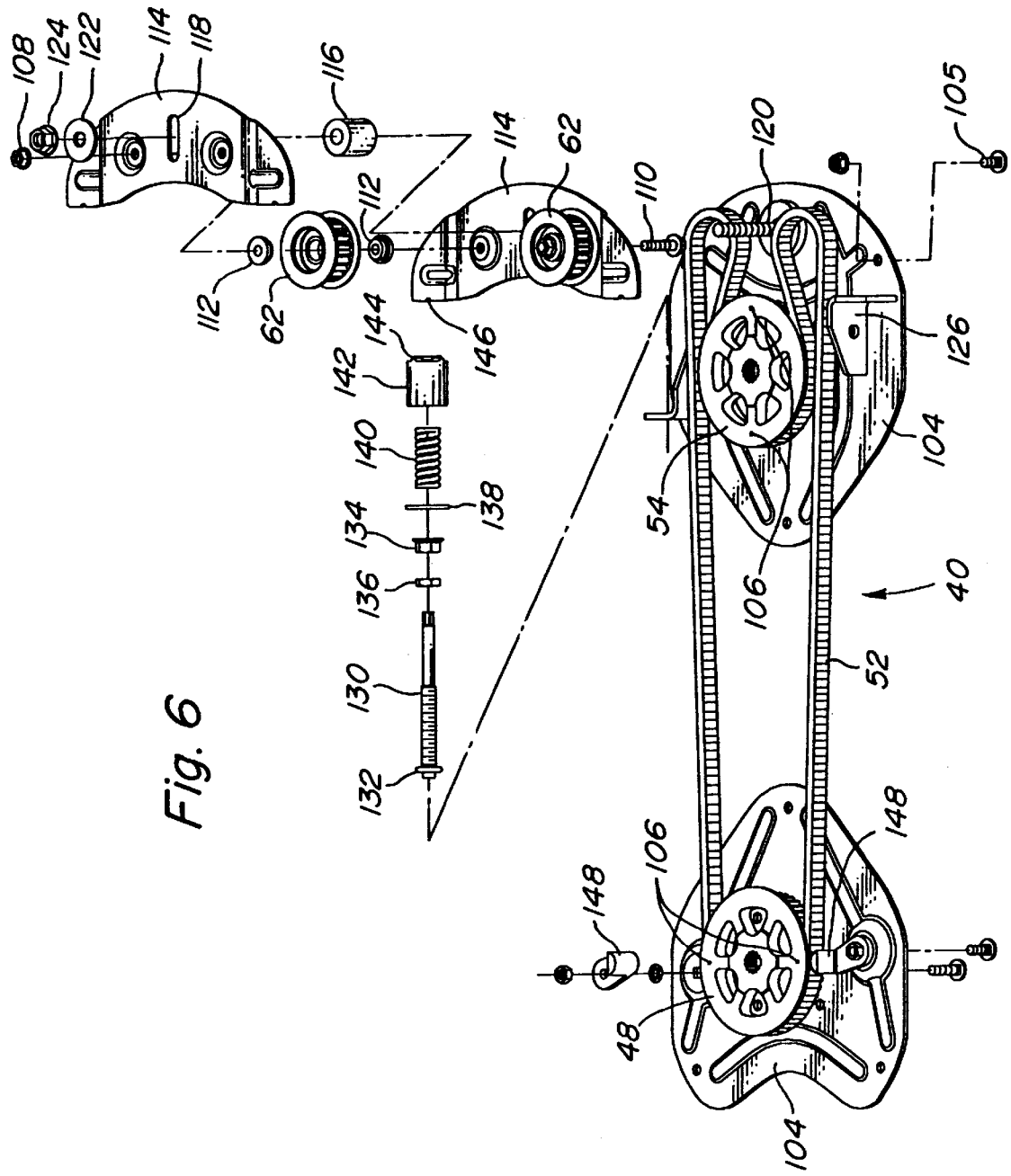
FIG. 6 illustrates an exploded view of the secondary drive assembly.

Referring now to FIG. 6, the secondary drive assembly 40 is shown in exploded fashion. The secondary drive assembly 40 is supported on the deck 12 (FIG. 2) by mounting on support plates 104 which are secured to the deck within cavities in the housing. Formed features in the housing 34 include stiffening ribs and flat surfaces for mounting the plates 104 to the housing 34 as with bolts 105. The formed features of the housing 34 and the support plates 104 work together to add strength and stiffness to the deck 12, which minimizes loaded deflections. The resulting structure is substantially strong to prevent permanent deformation of the housing 34 and components of the secondary drive assembly 40 when loads exceed the capacity of the belt 52.

In the secondary drive assembly 40, rotational power is received from the primary drive assembly 38 by the mower deck pulley 48 through the jacksheave. The secondary drive belt 52 is entrained around the pulley 48 so that its teeth mate with those on the pulley 48. The belt 52 is similarly entrained around idler pulleys 62 and a the driven mower deck pulley 54. The idler pulleys 62 are used as part of a tensioning assembly to tension the belt 52 and also to enable the mower deck pulleys 48, 54 to rotate in opposite directions.

The mower deck pulleys 48, 54 are secured to the support plates 104 by their respective spindles 50, 56 (FIG. 2) and rotate therewith so that the rotation of the pulleys 48, 54 is identical to the rotation of the blades 32 secured at the lower end of the spindles 50, 56. The pulleys 48, 54 and the driven primary sheave 46 above the pulley 48 are provided with alignment indicia such as depressions 106 so that blade position may be determined without looking beneath the housing 34. The depressions 106 on each pulley 48, 54 are aligned in the direction of blade position so that their positions in FIG. 6 correspond to a blade offset of 90 degrees. With this offset, the blades 32 may counterrotate and overlap in cutting area while not interfering with each other.

A tensioning assembly of the secondary drive assembly 40 will now be described. The tensioning assembly includes the idler pulleys 62 which are rotatably mounted in the secondary idler bracket 64 by a nut 108, bolt 110 and bushings 112. The bracket 64 itself is made up of top and bottom plates 114 which are identically formed and held together by bolts 110 as well as a rigid sleeve 116 disposed between them. The bracket 64 is attached to the support plate 104 by a bolt 120 which extends through slots 118 in the top and bottom plates 114 and the sleeve in between. A washer 122 and nut 124 serve to tighten the bracket 64 to the support plate 104 against relative movement.

When installed on the plate 104, one end of the bracket will abut a stop 126 on the support plate 104. On the opposite side of the support plate 104, a tension bracket 128 is provided having an orifice into which the end of a tensioning bolt 130 is inserted. A collar 132 is provided adjacent the end of the bolt 130 to prevent the bolt 130 from sliding further through the orifice. A tension adjustment nut 134 and a jam nut 136 are engaged on a threaded portion of the bolt 130, and a washer 138, spring 140 and tensioning sleeve 142 are inserted over the bolt 130. An end of the tensioning sleeve 142 is provided with protrusions 144 which are received in corresponding notches 146 in the top and bottom plates 114 of the bracket 64, serving to maintain desired relationship between the bolt 130 and the bracket 64.

After the bolt 130, nuts 134, 136, spring 140 and sleeve 142 are properly positioned between the tension bracket 128 and the idler bracket 64, tension on the belt 52 may be increased by loosening the nut 124 to allow relative movement between the plate 104 and the bracket 64 and then tightening the tension adjustment nut 134 against the tensioning sleeve 142. The sleeve is thereby pressed against the idler bracket 64, and moving the idlers to effectively increase the length of the path of the belt 52. The abutment of the end of the bracket 64 against the stop 126 is maintained by the tension of the belt, but the bracket 64 pivots and translates somewhat as the force is applied to its other end by the sleeve 142. Movement of the bracket 64 is restricted when the bolt 120 abuts the ends of the slots 118 in the bracket.

When a desired belt tension is achieved, the nut 124 and the jam nut 136 can be tightened to maintain the tension.

Preferably, a spring of known spring constant is used to achieve a specified belt tension which will occur at or near the point that the spring is compressed within the sleeve 142 so that the bolt 130, adjustment nut 134, washer 138 and sleeve become a rigid structure. The abutment of the washer 138 against the sleeve 142 is an effective visual clue so that the desired tension in the belt 52 may therefore be reliably reproduced during assembly and when the belt 52 is replaced.

Preferably, an end of the bolt 130 has a noncircular cross section such as the hexagonal cross section shown which may be engaged by a power tool during assembly since the proximity of the adjustment nut to the plate 104 may prevent use of standard power tools.

The positioning of the idlers 62 in the secondary drive assembly 40 shown provides a high degree of belt wrap (greater than 180 degrees) around the pulley 54, helping further to reduce the risk of ratcheting and loss of timing. In the preferred embodiment, the pulley 48 is provided with adjustable belt guides 148 bolted to the support plate 104 adjacent the pulley 48 to further prevent the possibility of the belt 52 ratcheting.

According to the present invention a secondary drive assembly 40 is provided wherein the idlers 62 which tension the belt 52 are rigidly mounted and fixed so as to prevent movement under normal and high impact belt loads on either the right or left spindle 48, 54 by forming a solid path of rigid elements upon tensioning the drive belt 52. The belt 52 is tensioned directly by spring forces generated and controlled by the tensioning sleeve 142; the tensioning spring 140 is collapsed to a predictable and repeatable length generating the required belt tension which is not significantly changed by tightening of the bolt 120 and nut 124.

Although the invention is described with reference to an illustrative embodiment, it will be understood by those skilled in the art that the invention may be advantageous in the form described as modified for use in other applications. The present invention should not be limited to the above-described embodiment, but should be limited solely by the claims that follow.

We claim:

1. A mower deck including a tensioning assembly for a synchronous belt drive said tensioning assembly comprising:

a bracket having first and second end portions;

a plurality of idlers rotatably mounted on the bracket between the first and second end portions;

an abutment surface mounted on the deck, said abutment surface being operatively coupled to the first end portion of the bracket for transmitting force thereto in a direction for restricting movement of the bracket beyond the abutment surface;

said bracket having an elongated slot disposed between the abutment surface and at least one of the plurality of idlers;

a member fixed to the mower deck engageable with the slot for restricting relative movement of the bracket; and a tensioning member operatively coupled to the second end portion of the bracket, said tensioning member acting on the bracket in substantially the same direction as the abutment surface.

2. The tensioning assembly of claim 1 wherein the tensioning member comprises a helical spring.

3. The tensioning assembly of claim 2 wherein the tensioning member further comprises a threaded rod extending through the spring, a nut engaged on the threaded rod and a sleeve movable along an axis of the rod in response to movement of the nut.

4. The tensioning assembly of claim 3 wherein the sleeve has protrusions which are engageable with corresponding notches in the bracket.

5. The tensioning assembly of claim 1 wherein the elongated slot is positioned between two of the plurality of idlers.

6. The tensioning assembly of claim 1 wherein the bracket comprises top and bottom plates.

7. The tensioning assembly of claim 6 wherein the top and bottom plates are identical.

8. A mower deck including a tensioning assembly for a synchronous belt drive wherein a toothed belt is entrained around a plurality of mower deck pulleys, each mower deck pulley associated with a spindle and attached mower blade, and first and second idler pulleys, said tensioning assembly comprising:

a bracket having first and second end portions;

said first and second idler pulleys rotatably mounted on the bracket between the first and second end portions;

an abutment surface mounted on the deck, said abutment surface being operatively coupled to the first end portion of the bracket for transmitting force thereto in a direction for restricting movement of the bracket beyond the abutment surface;

said bracket having an elongated slot disposed between the abutment surface and at least one of the plurality of idlers;

a member fixed to the mower deck engageable with the slot for restricting relative movement of the bracket; and a tensioning member operatively coupled to the second end portion of the bracket, said tensioning member acting on the bracket in substantially the same direction as the abutment surface.

9. The tensioning assembly of claim 8 wherein the tensioning member comprises a helical spring.

10. The tensioning assembly of claim 9 wherein the tensioning member further comprises a threaded rod extending through the spring, a nut engaged on the threaded rod and a sleeve movable along an axis of the rod in response to movement of the nut.

11. The tensioning assembly of claim 10 wherein the sleeve has protrusions which are engageable with corresponding notches in the bracket.

12. The tensioning assembly of claim 8 wherein the elongated slot is positioned between the first and second idler pulleys.

13. The tensioning assembly of claim 8 wherein the bracket comprises top and bottom plates.

14. The tensioning assembly of claim 8 wherein the top and bottom plates are identical.

15. The tensioning assembly of claim 8 wherein the first and second idler pulleys are positioned so that the belt is entrained more than 180 degrees around at least one of the mower deck pulleys.

16. The tensioning assembly of claim 8 wherein mower blades associated with two of the plurality of mower deck pulleys are driven by the belt to rotate in opposite directions.

17. The tensioning assembly of claim 8 wherein at least one of the plurality of mower deck pulleys includes blade alignment indicia, said indicia showing the relative position of the blades.

* * * * *